United States Patent Office 3,470,006
Patented Sept. 30, 1969

3,470,006
PRODUCTS FROM ACID SLUDGES
Henri Brunel, 9 Rue du General, Niox,
Paris 16, France
No Drawing. Continuation-in-part of application Ser. No. 181,498, Mar. 19, 1962. This application Oct. 21, 1965, Ser. No. 500,169
Claims priority, application France, June 15, 1961, 865,052
Int. Cl. C08h *17/28;* C04b *34/30*
U.S. Cl. 106—123                             11 Claims

ABSTRACT OF THE DISCLOSURE

This invention relates (1) to a process for making useful coating and water proofing compositions with acid sludges as an essential ingredient thereof, by neutralizing and plastifying such acid sludges in the presence of a solvent mixture which is liquid at 50–90° C. and which comprises bitumens, higher fatty acids, resinic acids, naphthenic acids, tall oil of mixtures thereof, and (2) to the composition so produced.

---

This application is a continuation-in-part of my U.S. application Ser. No. 181,498, filed Mar. 19, 1962.

This invention relates to a process for obtaining plastic products from acid sludges and to the products thus obtained.

Among the objects of the invention is to provide a method of obtaining useful products from acid sludges and similar material which ordinarily provide a disposal problem.

Among the objects of the invention is to provide a method of disposing of acid sludges and other waste products of the petroleum industry while simultaneously producing a useful product therefrom.

Among other objects of the invention is to provide a process of making compositions such as mastic compositions, useful as waterproofing sealants, coating materials, calking agents and impregnating agents from waste materials of the petroleum industry.

The objects of the invention are attained by neutralizing acid sludges by adding them to a powdered neutralizing agent dispersed in a thick resinous solvent mixture which is liquid at 50–90° C. to directly provide the basic mastic composition of the invention.

The solvent mixture comprises 5–60% of the basic mastic composition and is made up of a mixture of materials selected from the group of bitumens, higher fatty acids, resinic acids, naphthenic acids, tall oil, with the provision that up to 70% (preferably 5–30%) of the mixture are preferably natural or synthetic drying oils, unsaturated hydrocarbon extracts obtained in oil refining processes, and unsaturated, drying hydrocarbon polymers and resins obtained from the preparation of light hydrocarbon fuels by the steam cracking process and up to 15% (preferably 0.5–15%) of the mixture is preferably a mineral oil.

The powdered neutralizing agent consists of one or more powdered alkaline earth hydroxides or carbonates. These powdered materials are dispersed in the solvent mixture while maintaining the temperature of the latter at 50–90° C. Said neutralizing agents are added in sufficient proportion to neutralize the 20–75% of the acid sludge that is to be added. This component also reacts with the fatty resinic or naphthenic acids or tall oil to produce corresponding soaps which act as agglutinizing agents.

The acid sludge is added in proportions of 20–75% of the basic composition. The metal salts produced by the action of the alkaline earth hydroxides or carbonates with the acid of said sludges act as a filler in the resultant mastic.

Drying agents such as the manganese, iron, lead, cobalt, zinc, calcium, and cerium salts of naphthenic, octoic and decanoic acids may be added to the composition containing drying oils in the proportion of 0.5 to 5% based on the weight of the composition.

Various additional fillers such as kaolin, mica, clay, fuller's earth, infusional earth, calcium sulfate, whiting, metal oxides, cork, sawdust, etc., may be added. As further explained below, spent clay may be included as a source of both filler (clay) and solvent (bitumens and other hydrocarbons). Fibrous fillers such as asbestos, rock wool, glass fibers, metal fibers, natural and synthetic organic fibers may be added for increasing the strength of the mastic.

Wetting agents may be added for increasing the plasticity and malleability of the mastic and for aiding in its formation. Suitable wetting agents include the polyalcohols polyepoxyglycols, soaps, sulfonates, amidoalcohol, ester alcohols, etc., and may be incorporated in proportions of 0.2 to 2% of the composition.

Elastomeric compounds that can be blended with the compositions to provide compositions which are impenetrable to gas and vapors are the polybutenes, especially those of relatively high molecular weight between 1,500 and 2,500 for example. Also polyvinyl acetates can be blended with the compositions. Epoxide resins and drying esters therefrom may also be blended with the compositions to provide compositions for very resistant sealing and coatings.

Tars from wood distillation may also be blended with the composition, especially as antiseptics, fungicides and algicide components.

The acid sludges or tars obtained in the refining of mineral oils set forth as a component (a) may further be defined as follows. In the refining of hydrocarbon oils with sulfonating reagents, there is separated from the refined or reclaimed oil, a dark, pasty or syrupy, strongly acid residue which contains the excess of the sulfonating reagent (sulfuric acid, etc.) together with compounds resulting from the reaction of this reagent on the unsaturated components of the oil, which compounds are insoluble or only partly soluble in the oil phase and settle at the bottom of the refining tanks in the decantation operation or pass off with the heavier phase in the centrifugal operation. These residues constitute the acid sludges or tars. They may be made up of one or more of several types of compounds depending on the type of oil refined, the strength of the sulfonating agent, and the length of time and temperature of the contact with the sulfonating reagent. Two general types are water soluble and water insoluble acid sludges.

The water soluble acid sludges which usually are a by-product of the process of highly refining fluid oils utilizing strong sulfonating reagents, can often be separated and/or reacted to produce valuable products. See applicant's French Patent No. 1,251,205, for example.

Water insoluble sludges are produced in greater proportion than the water soluble type and these products do not have any ready utility and are sometimes discarded in dumps. In fact, however, the disposal of such sludges has become an industrial problem in many instances. The most usual method of disposal is by burning which requires ovens and other equipment made of special materials, etc. My U.S. Patent No. 3,149,063 discloses one process of eliminating or disposing of acid sludges. An object of the present invention is to provide another method of utilizing and simultaneously disposing of said acid sludges (including the water insoluble sludges). The fatty acids referred to are the higher fatty acids which may also be obtained from waste materials such as rancid animal and vegetable oils.

The resinic acids are the acids obtained from natural resins.

The naphthenic acids are the acids found in many petroleums.

The drying oils which may be added include the animal, mineral and vegetable drying oils, such as linseed, soya, fish and tall oils, and the drying mineral oils as defined above.

Another waste product of the oil industry which can be utilized according to the present invention is the spent clay or similar material (fuller's earth, for example) obtained as a waste material during the final decoloration of refined oil. When the chemical refining of oil is finished, the oil still is submitted to a decoloring operation by introducing fuller's earth, kieselguhr or bleaching clay or diatomaceous earth into the oil while hot and with agitation and then separating the decolored oil by filtration. The filter cakes obtained from the filters have a dark color, having retained some of the hydrocarbons, and present another disposal problem. Such waste materials are also useful together with, or in place of the acid sludges described above.

Still other products which present somewhat of a disposal problem are the drying type of oils produced by the petroleum industry. Such oils are not adapted for lubricating purposes because of their unstable, unsaturated or aromatic composition. Some such oils are obtained by refining oils by the solvent extraction method and are known as "extracts"; other unstable, unsaturated oils are obtained as "polymers" in the steam cracking process. These extracts and polymers can be employed for all or a part of component (a) referred to above.

It has further been found that owing to the diverse uses to which these compositions may be put, it is desirable to provide a master batch of the basic material.

The present invention also relates to an improved process for preparing the master batch of the basic material. It had been found that the kneading process for mixing the components of the composition requires special, oversized, corrosion-resistant apparatus because of the gases and steam liberated during the neutralizing operation. According to the present invention a liquid solvent diluting mixture made up of those ingredients in the mastic (exclusive of the strongly acid sludge) which are liquid at 50–90° C. is first provided in a suitable mixing vessel, the neutralizing powder is disposed in this liquid mass and only thereafter are the acid tars or sludges gradually added to this mixture while maintaining the temperature thereof at about 50–90° C., either by heating, cooling or by adjusting the rate of addition of the acid tars.

In the specification and claims, proportions given are by weight unless otherwise specified.

The invention will now be illustrated with Examples of preparations which have been realized by the inventor and which shall enable anyone skilled in the art to perform the process and to obtain the compositions thereof.

Example 1

In a steel mixer which can be closed and is fitted with aspiration and absorption system for acid vapors, there are introduced 140 kilograms of a viscous unsaturated hydrocarbon extract from refining petroleum oils by solvent extraction with liquid $SO_2$, phenols, or furfural, having a viscosity not less than 4° Engler at 50° C., for example, the products commercially sold under the trademarks Dutrex, Iranolin or Nuso, to which are added 80 kilograms of raw tall oil and 80 kilograms of a hydrocarbon clay-treated drying polymer (for instance one of the products commercially known under the registered trademarks CTLA Polymer (Clay Treated Louisiana Polymers) or Escopol). To this liquid mixture which constitutes the diluting solvent according to the invention, there are incorporated while mixing 200 kilograms of calcium hydroxide, i.e., slaked lime. In the homogeneous fluid mixture thus obtained, there are introduced progressively 350 kilograms of acid sludge obtained in the process of re-refining contaminated motor oils with 66° Baumé sulfuric acid. The addition of a sludge is effected carefully at the beginning in order to avoid a sudden and important increase of the temperature with consequent foaming and swelling of the mass. In case this happens, addition of sludge is immediately stopped until the foam has disappeared and then the addition of sludge is again effected at suitable speed for obtaining a controlled reaction. In this connection, when the reaction begins, which is shown by the increase of the temperature, the rate of addition of acid sludge is regulated together with the cooling in order that the temperature preferably does not overstep the limit of 90° C. and stands at between 60° and 90° C. The quantity of slaked lime has been calculated to have an excess of neutralizing power with respect to the acid index and the quantity of the acid sludge to enter in the final composition. Said excess of slaked lime acts as saponifying agent for the tall oil organic acids. There is thus obtained a hot smooth paste which constitutes the basic product of the invention and to which complementary products may be added while kneading.

There is now added, 100 kilograms of chalk in fine powder form and 70 kilograms of asbestos fiber of medium length. When the paste obtained after these additions is homogeneous, and the temperature has decreased to less than 50° C. there is added 20 kilograms of a drying agent in the form of a solution in white spirit containing lead naphthenate 42%, cobalt naphthenate 12%, manganese naphthenate 14%, white spirit 32%. The kneading is continued for about one hour and there is finally obtained an excellent black sealant of low manufacturing cost, having excellent tightness properties, very adherent to any material, remaining palstic after having been in use for a long time and never becoming brittle. This sealant may be applied with a knife or with a gun and is utilizable for waterproofing sealing in glazing and roofing and for making waterproof joints in the building industry. For applying with gun, the viscosity may be decreased either by adding while manufacturing, 1 to 5% of a spindle petroleum oil or of a synthetic hydrocarbon oil of same viscosity or by adding in the final composition 1 to 4% of white spirit or benzol.

Example 2

In a steel mixer as in Example 1, there are introduced 150 kilograms of distilled tall oil, 80 kilograms of an unsaturated extract obtained from petroleum refining by solvent extraction having a viscosity of 4 to 6° Engler at 50° C. and 30 kilograms of a synthetic hydrocarbon oil of the alkyl aryl type having a viscosity of 4° Engler at 50° C. This mixture constitutes the diluting solvent for the acid sludges according to the invention, in which there are incorporated 200 kilograms of slaked lime in powder form. In the fluid smooth paste thus obtained there are progressively added while kneading, 300 kilograms of an acid sludge obtained in refining a lubricating petroleum oil having a viscosity of 8° Engler at 50° C. with 66° Baumé sulfuric acid. The perfectly homogeneous paste thus obtained, constitutes the basic product according to the invention.

To this product, there are added, while continuing kneading, 800 kilograms of chalk or calcium carbonate in powder form, 80 kilograms of asbestos fiber of medium length, 40 kilograms of asbestos in fine powder form and 20 kilograms of a drying agent consisting of lead, cobalt, and manganese naphthenate dissolved in white spirit. Kneading is continued until homogeneous. Thereafter, 10 to 20 kilograms of white spirit may be added for obtaining a viscosity suitable for applying with a spatula, hand gun or air gun. The brown paste constituting the final composition thus obtained, may be used as a mastic or putty since it is very adherent, remains plastic even after having been exposed for a long time and never becomes brittle. It is suitable for sealing in the building industry and especially for glazing.

Example 3

The sludges from re-refining with 66° Baumé sulfuric acid of contaminated motor oil of Example 1 or the sludges from refining, lubricating petroleum oil of Example 2, are replaced by acid sludges coming from super refining or an oil of a viscosity of 5° to 7° Engler at 50° C., having first been refined by solvent extraction with furfural and then further or super refined with oleum to prepare viscous pharmaceutical oils of a viscosity of about 5° Engler at 50° C., as required by pharmacopoeia specifications. The treatment is the same as in Examples 1 and 2, but the proportion of neutralizing agent (slaked lime in powder form) is adapted to the acid content of the sludge as determined by simple analysis. In this connection, it is emphasized that the acid content of this sludge is variable according to the step of refining from which the acid sludge comes, since super refining with oleum is frequently effected in several steps using different proportions of acid reagent (see applicant's Patent No. 3,164,547).

Sludges coming from the last refining steps are of little interest for the present process on account of their very high excess of sulfuric reagent. Such "last step" acid sludges are often used in refineries as a sulfonating reagent for former steps or for other refining operations, precisely on account of their high content in sulfuric reagent. However, in the refineries effecting oil super refining, the sludges which are not reused as sulfonating reagent are discarded altogether and these sludges which are ordinarily discarded are the sludges which are treated according to the present invention. Nevertheless, it is emphasized that where the process of this application is to be exploited on a large scale it is preferable to use fresh sludges coming from a determined step of refining or mixtures of sludges from different steps but always in about the same proportion when it is desired to obtain uniform properties for the compositions of the process obtained from such acid sludges. It must be noted, besides, that the sealants obtained with the acid sludges from the super-refining of oils as in the present example, are usually not of black color but of a more or less clear brown color.

Example 4

140 kilograms of petroleum bitumen having a melting point between 95° and 120° C. are molten or introduced in the liquid state in a heated mixer of the type described in Example 1. Then, there are added in the liquid bitumen 150 kilograms of raw tall oil, 60 kilograms of the same unsaturated extract as in Example 1, 70 kilograms of the same hydrocarbon drying polymer and 30 kilograms of a synthetic hydrocarbon oil of the alkyl aryl type having a viscosity of 3 to 4° Engler at 50° C. or the corresponding amount of a spindle petroleum oil preferably of the naphthenic type. While mixing, there is formed a liquid mixture of which the temperature is maintained between 50° and 90° C. In this mixture there are introduced, while kneading, 100 kilograms of slaked lime in powder form and in the fluid, smooth paste thus obtained, 250 kilograms of acid sludges of the same type as in Example 1 are introduced progressively while kneading and regulating the temperature within the same range of 60°–90° C.

To the homogeneous basic pasty product thus obtained according to the process of the invention, complementary products are added as follows: 140 kilograms of chalk in powder form and 60 kilograms of asbestos fiber of medium length. Finally, there are incorporated, when the temperature has decreased under 50° C., 20 kilograms of the same drying agent as in Example 1 and there is obtained an excellent black sealant especially suitable for waterproofing, the sealing of glass, the sealing of cracks and sealing of intervals between parts of building foundations.

Example 5

With a view of increasing adhesive and drying properties, tall oil is replaced in Examples 1 to 4 by an oil selected from linseed oil, soya oil, fish oil which may be partly mixed with olein and in which there is dissolved an abietic resin or a resinic polymer from steam cracking.

Example 6

In Examples 1 to 4, tall oil is replaced by an additional amount of the clay-treated drying polymer (sold under the trademark CTLA (Polymer or Escopol). The drying properties of the resultant mass, the superficial waterproofing properties of the dry film formed on the surface thereof when applied, is thereby increased and the resultant composition is free of vegetable or animal oils which are fermentable when in presence of humidity and water.

Example 7

300 kilograms of spent clay of light grey color, extracted from filter plates employed in the decoloration of a white pharmaceutical oil of a viscosity between 4°, 5° and 6° Engler at 50° C. are progressively mixed with a diluting solvent consisting of 40 kilograms of tall oil, 40 kilograms of the unsaturated hydrocarbon extract sold under the trademark Iranolin 80 and 40 kilograms of hydrocarbon drying polymer sold under the trademark of CTLA Polymer, while heating and kneading at between 50° and 90° C. The homogeneous paste obtained constitutes the basic composition of the invention.

To this composition, there are added, while hot and while keading, 500 kilograms of chalk in powder form and 50 kilograms af asbestos fiber of medium length. 20 kilograms of the drying agent as in the above examples are then added when the mass has cooled under 50° C. There is obtained a mastic of light grey color which rapidly congeals and is suitable for glazing and sealing.

Example 8

430 kilograms of black spent clay extracted from filter plates in decoloration of a re-refined motor oil which has been treated according to the conventional process of regenerating contaminated motor oil with 66° Baumé sulfuric acid, are mixed with a diluting solvent comprising 250 kilograms of molten high vacuum petroleum bitumen, or air blown petroleum bitumen of melting point about 140–160° C. mixed with 70 kilograms of the unsaturated hydrocarbon extract sold under the trademark Dutrex V4.

To the hot, fluid, homogeneous paste thus obtained, constituting the basic composition of the invention, there are added, while keading 130 kilograms of calcium carbonate, 80 kilograms of asbestos fiber of medium length and, finally, when the temperature has decreased under 50° C., 20 kilograms of the drying agent described in Example 1. There is obtained an excellent black mastic suitable for glazing and sealing in the building industry and of which the viscosity may be adapted to the means for applying by adding a supplement of Dutrex V4, or 5 to 30 kilograms of white spirit or benzol at the end of the preparation.

Example 9

In Example 8, the 70 kilograms of Dutrex V4 are replaced by 25 kilograms of linseed oil, 25 kilograms of tall oil and 25 kilograms of Dutrex V4.

Example 10

In Example 8, the proportion of spent clay is reduced to 350 kilograms and the proportion of bitumen increased to 350 kilograms in order to increase the waterproofing properties of the complete composition. There may be also added from 10 to 60 kilograms of a light hydrocarbon oil in the diluting solvent of the present example for obtaining the viscosity desired.

Example 11

In a heated mixer of Example 1, there are molten 100 kilograms of bitumen having a melting point of 95°–150° C. which may have been derived from coal, shale or petroleum. Into the molten bitumen, there are mixed 70 kilograms of raw tall oil, and 70 kilograms of the unsaturated hydrocarbon extract sold under the trademark Iranolin 80. To the diluting solvent thus obtained, there are incorporated 100 kilograms of spent clay from decoloration of a re-refined motor oil and 150 kilograms of slaked lime in powder form. To the fluid hot paste, thus obtained there are added progressively, while kneading, 250 kilograms of an acid sludge from re-refining of contaminated motor oil with 66° Baumé sulfuric acid as in Example 1.

To the basic composition thus obtained, there are added while kneading, 100 kilograms of chalk in powder form, 70 kilograms of asbestos fiber of medium length and, when temperature has decreased to below 50° C., 20 kilograms of the white spirit solution of the same drying agent as in Example 1 mixed with 70 kilograms of the hydrocarbon drying powder sold under the trademark CTLA Polymer. There is thus obtained, an excellent sealant containing both acid sludge and spent clay suitable for many sealing applications in the building industry.

Example 12

In a mixer as in Example 1, there are molten 270 kilograms of petroleum bitumen with which there are mixed 40 kilograms of unsaturated hydrocarbon extract sold under the trademark Dutrex V4, and 40 kilograms of fluid synthetic hydrocarbon oil of the alkyl aryl type having a viscosity of about 2° Engler at 50° C. To the diluting solvent thus obtained, there are added, while mixing, 380 kilograms of spent clay from decoloration of re-refined motor oil and then 40 kilograms of the hydrocarbon drying polymer sold under the trademark CTLA Polymer.

To the basic composition thus obtained, there are added, while kneading, 50 kilograms of chalk in powder form and 70 kilograms of asbestos fiber of medium length, as fillers, and as special complementary waterproofing and water-repellent product, 90 kilograms of a fatty alkylamino propylamine salt of naphthenic acid, of which the fatty alkyl amino group is derived from tallow and in which the alkyl radical has, thus, from 8 to 18 carbon atoms. Finally, there is added as a drying agent 20 kilograms of the white spirit solution of metal naphthenates as in Example 1, and, optionally, for obtaining suitable viscosity, 1 to 3% of white spirit or benzol. There is obtained a black sealant having waterproofing properties capable of forming a very water-repellent film and adapted for sealing under water.

Example 13

For obtaining a product for coating having the same waterproofing properties and being useful for the protection of metals against corrosion, the 70 kilograms of asbestos fiber of Example 12 are replaced by 70 kilograms of asbestos in fine powder form or the same amount of silica or of talc. Then the proportion of the light solvent finally added is increased in order to obtain the desired fluidity to permit application in layers of the desired thickness. Said solvent may be white spirit or light gasoline, or benzol, or a volatile ketone such as methylethyl ketone or a chlorinated hydrocarbon solvent such as trichlorethylene.

Example 14

When a composition for the protection of metal surfaces against corrosion is desired a filler able to act as a chemical inhibitor of corrosion is incorporated in the composition of Examples 12 or 13, thus zinc chromate in powder form may be added in proportion of 3 to 10% to said compositions.

Example 15

The fluidified composition of Example 13, is brought to the suitable viscosity for painting, spraying or dipping with a view to coating surfaces with thin films, by diluting with a light solvent selected from light hydrocarbon solvents, benzols, volatile chlorinated solvents, volatile ketones and is submitted to grinding in a paint grinder for obtaining an extremely fine dispersion of the fillers in the liquid midst so as to prevent decantation when the product settles during storage. Anti-precipitating paints stabilizers may be also added with this end in view, for instance, amine phosphates. Other compositions of the above examples when diluted with solvents and while replacing fibrous fillers by pulverulent fillers may be treated the same way and for the same purpose, especially compositions of Examples 1 and 16.

Example 16

In Examples 1–11 and 13–15, there are added as in Example 12 to the components set forth, 3 to 10% of a fatty amine or polyamine naphthenate for the same purpose of securing highly waterproofing properties and for allowing sealing or coating under water.

Example 17

In a heated mixer preferably closed and fitted with aspiration and absorption system, there are molten 350 kilograms of a petroleum bitumen having a melting point of 100–150° C. In the molten bitumen, there are mixed 100 kilograms of the viscous unsaturated extract from petroleum oil refining by solvent extraction known under the registered trademark Iranolin 80. Then there are incorporated in this hot fluid mixture constituting the diluting solvent 200 kilograms of slaked lime in powder form. The temperature having decreased to about 80° C., there are progressively introduced in the smooth paste thus formed, 350 kilograms of an acid sludge from re-refining of contaminated motor oil with 66° Baumé sulfuric acid. There is obtained a homogeneous, bright black mass having the consistency of a fluid paste when hot and which, after cooling, forms a compact solid mass constituting a very important basic composition. This composition is, in fact, possessed with high adhesive and very interesting plastic properties allowing it to be used for ground and roadways coating, either as it is or by mixing with granulous fillers of desired size. It may also be supplemented by the addition of very diverse complementary products with a view to obtaining compositions for specialized applications. For instance by adding drying oils, fillers and drying agents for obtaining sealants of the type stated in Example 1 which can be applied with knife or hand or air gun; or by adding both drying oils, pulverulent fillers, volatile solvents and drying agents as in several of the above examples, for obtaining fluid coatings and paints, or by adding water-repellent products as in Examples 12–15. In a mixture with spent clay in proportion of 20 to 100% there is obtained a very cheap and very interesting product for waterproof binding of materials in public works applications, especially for damming of waters.

Example 18

To 100 kilograms of the basic composition obtained in Examples 1 or 17, there are mixed 50 to 250 kilograms of the CTLA Polymer or Escopol defined hereabove for obtaining core oils of a viscosity allowing easy mixing with siliceous sand to provide a good and film agglomeration adaptable for preparing molds for metal molding in metallurgy. After baking, cores are obtained having very good mechanical resistance.

Example 19

In Example 18, there are mixed with CTLA Polymer or Escopol, 20, to 200% of linseed oil, or of fish oil or of a mixture of both fish oil and linseed oil.

Example 20

In Example 18 there is used instead of CTLA Polymer or Escopol a solution in linseed oil or in fish oil of a resinic polymer from unsaturated light hydrocarbons obtained in stream-cracking, for instance of the resin commercially known under the registered trademark Escorez.

Example 21

In the Examples 1 to 17, which relate to obtaining sealants, there are mixed with the compositions set forth, polybutenes of high molecular weight, between 1500 and 2500 in proportion between 2 and 40% depending on the application desired. There are obtained waterproofing sealants providing liquid, gas and vapors tightness and utilizable for tight sealing in any atmosphere and under water.

Example 22

Before adding fillers to the basic compositions obtained in the above examples, from acid sludges, said compositions are diluted so as to obtain a relatively low viscosity liquid by adding a light solvent such as light gasoline, white spirit, benzol, dichlorethane, trichlorethylene, perchlorethylene, methyl-ethyl ketone, methyl-isobutyl ketone, acetone, the solvent being chosen or several solvents being combined for obtaining the best solubility for the product obtained from the acid sludge. Such diluted solutions are useful for providing thin protective coatings on surfaces to be protected or, when very fluid, for impregnation of materials with a view to preservation and waterproofing. In this case, special additions, as for the sealants, may be effected, for instance additions of water-repellent drying fatty amine salts and as drying agents, metal naphthenates or octoates and decanates. Creosote may be also added. The coatings or impregnations effected with the diluted solutions have shown bactericide and fungicide properties which have interesting applications in the protection against putrifications of the materials coated or impregnated with these solutions. The solutions for impregnation may be filtered and the sediment recovered used in compact compositions.

Example 23

In Example 17, the 200 kilograms of slaked lime are partly replaced by a concentrated aqueous solution of an alkali-metal base, in proportion of 10 to 50% which are added after the slaked lime for completing the neutralization. There is obtained a composition which, in the liquid state may be emulsified by agitation with hot water to give stable emulsions when cooled. Such emulsions are suitable for coating without requiring solvents.

Example 24

To 100 kilograms of the composition obtained in Example 1, there are added 10 to 50 kilograms of a solution of polyvinyl acetate in methylcyclohexanone or in diacetone alcohol of a concentration between 25 and 40%. There are thus obtained sealants and products for coating having a certain elasticity and good mechanical resistance.

Example 25

100 kilograms of the composition obtained in Example 1 or in Example 17 are kneaded with 50 to 100 kilograms of a 50% concentration polyvinyl acetate aqueous emulsion plastified with butylphtalate. The homogeneous composition thus obtained constitutes an excellent sealant which is very adherent, elastic, and mechanically resistant.

Example 26

The aqueous emulsion or the solution of polyvinyl acetate used in Examples 24 and 25 are introduced in proportion of 10 to 50% as components of the diluting solvent in the manufacturing of compositions according to the invention set forth in the above Examples.

Example 27

Instead of the white fillers set forth in above examples, colored fillers may be used for obtaining colored compositions according to the process of the invention. For instance, for obtaining red sealants or paints, iron oxide is added as a filler in proportion of 2 to 25%. Metal powders and especially aluminum powder may also be added as fillers for giving a metallic aspect to the sealants, coatings or paints described in the above Examples, and for increasing their waterproofing, protective and tightness properties. In the case of light coatings to be applied to light materials, for instance for sound-proofing, fillers of the organic type such as for instance cellulose powder, wood flour, cork powder may be incorporated in the compositions of the invention instead or in combination with mineral fillers.

Now it must be understood that acid sludges are a rough residue of which the composition may vary within important limits as to oil and inorganic acids retained and to organic compounds content, so that, in all the above examples, the proportions of the components may vary according to the origin of the sludge, that is to say more precisely, according to the oil which has been refined and to the details of the method for refining. Nevertheless, anyone skilled in the art will be able to adapt without difficulty the formulations of the above examples to the composition of the sludge he has to employ. The principal corrections to effect will concern the proportion of the diluting solvent for the acid sludges, of neutralizing agent and of fillers in order to obtain the final product in the form suitable for the application desired. Anyhow, and despite these possibile variations, of proportions of the components, the process and the compositions of the invention do not change and remain realizable according to the method and formulations hereabove stated and described. The inventor has checked the various examples with specimens of acid sludges and spent clays supplied to him by different important refineries situated in different countries of the world, especially in France, United States, England, Germany and Spain.

I claim:
1. In the process of forming a mastic suitable as a sealing and coating material comprising acid sludge as an essential ingredient thereof the steps comprising
   (a) providing 5–60% of a solvent mixture which is liquid at 50–90° C. consisting essentially of the following ingredients,
      (1) a basis material selected from the group consisting of bitumens, higher fatty acids, resinic acids, naphthenic acids, tall oil, and mixtures thereof,
      (2) from 5 to 70% of said solvent mixture being a material selected from the group consisting of drying oils, unsaturated hydrocarbon extracts having a viscosity of not less than 4° Engler at 50° C., obtained from oil refining processes, and unsaturated drying hydrocarbon resins obtained in the preparation of light hydrocarbon fuels and in the steam cracking process,
      (3) up to 15% of said solvent mixture consisting of a mineral oil,
   (b) dispersing a powdered neutralizing agent selected from the group consisting of alkaline earth metal hydroxides and carbonates in said solvent mixture while maintaining the temperature thereof at about 50–90° C.,
   (c) thereafter gradually adding 20–75% of an acid sludge thereto,
the proportion of neutralizing agent added being sufficient to neutralize all of said acid sludge whereby to provide a basic mastic composition containing alkaline earth metal salts as a filler.

2. The process as claimed in claim 1 comprising adding 0.5 to 5% of drying agent selected from the group consisting of manganese, iron, lead, cobalt, zinc, calcium and cerium salts of naphthenic, octoic and decanoic acids to the composition after the sludge addition has been completed.

3. A sealing and coating composition comprising a base material made up of 5–45% of a solvent mixture which is liquid at 50° C.–90° C. and consisting essentially of (1) a basis material selected from the group consisting of bitumens, higher fatty acids, resinic acids, naphthenic acids, tall oils, and mixtures thereof, (2) 5–70% of a material selected from the group consisting of drying oils, unsaturated hydrocarbon extracts having a viscosity of not less than 4° Engler at 50° C. obtained from oil refining processes, and unsaturated drying hydrocarbon resins and (3) up to 15% of a mineral oil
and 20–75% of the reaction product of an acid sludge with a compound selected from the group consisting of alkali earth metal hydroxides and carbonates.

4. A process as claimed in claim 1 in which a portion of unsaturated hydrocarbon solvents is added to the solvent mixture in the form of spent clay containing such hydrocarbon residues.

5. A sealing and coating composition as claimed in claim 3 wherein said solvent mixture contains 5–45% of said component (2) and comprising 0.5 to 5% of a drying agent.

6. A sealing and coating composition comprising 10 to 90% of the base material of claim 3 and containing in addition:
  0.5 to 5% of a drying agent,
  2 to 25% of a fibrous filler based on the total amount of the final composition.

7. A sealing and coating composition comprising 10–90% of the base material of claim 5 and containing additional pulverulent filler material to provide up to 40% of total filler based on the total amount of the final composition.

8. A coating composition comprising 10–90% of the base material of claim 5 and containing 1 to 75% based on the weight of the final composition of a volatile solvent, said volatile solvent being present in sufficient proportion to provide a composition which is flowable at normal room temperatures.

9. A sealing and coating composition comprising 10–90% of the base material of claim 5 and comprising in addition 0.2 to 2% based on the total weight of the final composition of a wetting agent.

10. A sealing and coating composition comprising 10–90% of the base material of claim 5 and comprising a significant proportion of a solution of polyvinyl acetate.

11. A sealing and coating composition as claimed in claim 5 comprising 3–10% of a fatty alkylamino propylamine salt of naphthenic acid of which the alkyl group thereof contains 8 to 18 carbon atoms to provide water repellency.

References Cited

UNITED STATES PATENTS

| | | | |
|---|---|---|---|
| 2,448,621 | 9/1948 | Rice | 106—123 |
| 2,544,391 | 3/1951 | Marling | 106—123 |
| 2,616,814 | 11/1952 | Mahler | 106—123 |
| 2,793,138 | 5/1957 | Wilkinson | 106—123 |
| 2,828,215 | 3/1958 | Dunlap | 106—123 |

DONALD J. ARNOLD, Primary Examiner

U.S. Cl. X.R.

106—14, 264, 265, 266, 269, 278, 281, 282; 260—23, 27, 28.5, 41